US012775902B2

(12) United States Patent
Sanor et al.

(10) Patent No.: US 12,775,902 B2
(45) Date of Patent: Oct. 27, 2026

(54) OPTIMIZATION OF VEHICLE HAULER LOADING AND TRANSPORTATION ROUTES

(71) Applicant: TOYOTA MOTOR ENGINEERING & MANUFACTURING NORTH AMERICA, INC., Plano, TX (US)

(72) Inventors: Anthony D. Sanor, Melissa, TX (US); Dean H. Butts, Plano, TX (US); Adam J. Mantelmacher, Frisco, TX (US); Jamese Yarber, Carrollton, TX (US); Mark Derickson, The Colony, TX (US); Zhaojian Li, East Lansing, MI (US); Ilya Kolmanovsky, Ann Arbor, MI (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 586 days.

(21) Appl. No.: 17/307,715

(22) Filed: May 4, 2021

(65) Prior Publication Data

US 2022/0357168 A1 Nov. 10, 2022

(51) Int. Cl.
*G06Q 10/0832* (2023.01)
*G01C 21/34* (2006.01)
(Continued)

(52) U.S. Cl.
CPC ....... *G06Q 10/0832* (2013.01); *G01C 21/343* (2013.01); *G06Q 10/08355* (2013.01); *G06N 3/044* (2023.01)

(58) Field of Classification Search
CPC ......... G06Q 10/0832; G06Q 10/08355; G06N 3/09; G06N 3/044; G01C 21/343
See application file for complete search history.

(56) References Cited

U.S. PATENT DOCUMENTS 4,668,142 A * 5/1987 Fity .......................... B60P 3/08 410/29.1
5,051,046 A 9/1991 Oren
(Continued)

FOREIGN PATENT DOCUMENTS

CN 106017496 A 10/2016

OTHER PUBLICATIONS

Waller et al., “A chance-constrained based stochastic dynamic traffic assignment model: Analysis, formulation and solution algorithms” (Transportation Research Part C 14 (2006) p. 418-527). (Year: 2006).*
(Continued)

*Primary Examiner* — Michael P Harrington
*Assistant Examiner* — Brian A Tallman
(74) *Attorney, Agent, or Firm* — HAYNES AND BOONE, LLP

(57) ABSTRACT

A system and method to optimize the loading of vehicle haulers and their transportation routes is described herein. The system considers various loading constraints (e.g., dimension, weight, etc.), legally allowed daily drive hours and vehicle destination proximity, and generates a loading plan that minimizes the number of trucks to be used. The disclosed embodiments will also incorporate real-time and predicted traffic information to generate an optimal route to deliver the vehicles to multiple destinations.

16 Claims, 7 Drawing Sheets

(51) Int. Cl.
*G06N 3/044* (2023.01)
*G06Q 10/083* (2024.01)

(56) References Cited

U.S. PATENT DOCUMENTS

| | | | | |
|---|---|---|---|---|
| 6,931,314 | B2 | 8/2005 | Holland | |
| 9,739,634 | B2 * | 8/2017 | Trivedi | G01C 21/3679 |
| 10,161,746 | B2 | 12/2018 | Ochsendorf et al. | |
| 10,578,040 | B2 | 3/2020 | Liao-McPherson et al. | |
| 2003/0016495 | A1 | 1/2003 | Hongo | |
| 2004/0107111 | A1 | 6/2004 | Barts et al. | |
| 2008/0046302 | A1 * | 2/2008 | Cartwright | G06Q 10/083 705/7.22 |
| 2016/0300186 | A1 | 10/2016 | Scharaswak et al. | |
| 2017/0323249 | A1 * | 11/2017 | Khasis | G08G 1/0129 |
| 2019/0080266 | A1 * | 3/2019 | Zhu | G05D 1/0217 |
| 2020/0242285 | A1 * | 7/2020 | Huang | G06F 30/15 |
| 2021/0070304 | A1 * | 3/2021 | Weldemariam | B60W 40/06 |
| 2021/0081881 | A1 * | 3/2021 | Winckel | G01C 21/3453 |
| 2021/0302974 | A1 * | 9/2021 | Di Cairano | G06N 5/01 |

OTHER PUBLICATIONS

Lam et al. "Modeling impacts of adverse weather conditions on a road network with uncertainties in demand and supply", Transportation research part B: methodological 42.10, p. 890-910 (2008). (Year: 2008).*

Fathi et al. "A Quadratic Programming for Truck-to-Door Assignment Problem", World Academy of Science, Engineering and Technology International Journal of Mechanical, Aerospace, Industrial, Mechatronic and Manufacturing Engineering vol. 10, No. 8, (2016) (Year: 2016).*

Zachariadis et al., "Vehicle routing strategies for pick-up and delivery service under two dimensional loading constraints" (Operational Research 17 (2017), p. 115-143. (Year: 2017).*

Wikipedia entry for "recurrent neural network" <https://en.wikipedia.org/wiki/Recurrent_neural_network> (<https://web.archive.org/web/20170902022421/https://en.wikipedia.org/wiki/Recurrent_neural_network> captured on Sep. 2, 2017 using the Wayback Machine). (Year: 2017).*

Wikipedia "Travelling salesman problem" <https://en.wikipedia.org/wiki/Travelling_salesman_problem> (<https://web.archive.org/web/20200110072004/https://en.wikipedia.org/wiki/Travelling_salesman_problem> captured on Jan. 10, 2020 using Wayback Machine) (Year: 2020).*

"Toyota US car sales figures 2018," http://carsalesbase.com/us-car-sales-data/toyota, accessed: Nov. 8, 2019.

* cited by examiner

OPTIMIZATION OF VEHICLE HAULER LOADING AND TRANSPORTATION ROUTES

TECHNICAL FIELD

The subject matter described herein relates to delivery of vehicles to various destinations and, more specifically, to systems and methods to optimize loading of vehicle haulers and their interdepot transportation routes.

BACKGROUND

Vehicle logistics services (VLS) involve transporting vehicles to dealers or distribution centers for sales or subsequent processing. Considering the tens of millions of vehicles sold in the U.S., a conservative estimate of $500 per vehicle for the transport renders the approximated expenditure billions of dollars per year. The vehicles are transported using hauler trucks and the truck loading scheduling is a rather challenging task due to multiple restrictions in loading (dimensions, weight, time, vehicle destination proximity, etc.).

One major disadvantage of conventional loading operations is their heavy reliance on human operators' decisions at the scene. The use of human operators in loading decisions has led to frequent unutilized hauler bed spots and high variations in loading efficiency across multiple delivery partners. Further challenges arise when determining the routes to deliver the vehicles whose destinations sometimes are at different locations. As a result, these human driven routing choices have detrimental impacts on the distance and transit time to deliver the vehicles.

SUMMARY

Disclosed is a computer-implemented method and system to optimize loading of vehicle haulers and their transportation routes. In a generalized method, the system obtains a request to deliver vehicles to a destination. The system obtains one or more constraints of the hauler that will be used to deliver vehicles. The constraints may be dimensions of the hauler, weight tolerances of the hauler, road height limits, load balancing requirements, layer spacing of the hauler, legally allowed driving hours, or other constraints. Traffic patterns associated with the destination are then determined. Based upon the constraints and traffic patterns, a loading plan or route for the vehicle hauler is determined. The system then determines an estimated time of arrival for the vehicles to the destination(s), according to the loading plan and/or route.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the disclosed system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Illustrative embodiments and related methods of the present disclosure are described below as they might be employed in a system and method to optimize loading of vehicle haulers and to optimize their transportation routes. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, illustrative methods and embodiments of the present disclosure optimize the loading of vehicle haulers and their transportation routes for faster, more efficient delivery. The present disclosure provides a systematic, optimization-based truck loading and dynamic routing system to increase the vehicle loading efficiency and routing performance with standardized operational procedures. The illustrative systems will explicitly consider various loading constraints (e.g., dimension, weight, etc.), legally allowed daily drive hours and vehicle destination proximity, and generate a loading plan that minimizes the number of trucks to be used. The disclosed embodiments will also incorporate real-time and predicted traffic information and generate an optimal route to deliver the vehicles to multiple destinations.

The system also generates a modeling framework for a unified truck loading and dynamic routing problem by incorporating various loading constraints (e.g., maximum weight, load balancing, layer spacing), road height limits, and legal daily driving hours per day. The system then employs machine learning to develop a recurrent neural network (RNN) for accurate traffic forecasting by considering the spatio-temporal dynamics of the traffic. The traffic forecast will be exploited in a chance-constrained mixed integer programming (MIP) problem for the truck loading as well as in the dynamic routing optimization. To handle last-minute changes in vehicle deliver orders, the system also utilizes robust and efficient solvers using heuristics as well as the structural properties of the optimization problem. Accordingly, the disclosed methods will reduce the number of trucks used, which will consequently lower the transportation costs as well as greenhouse gas emissions.

Figure 1:
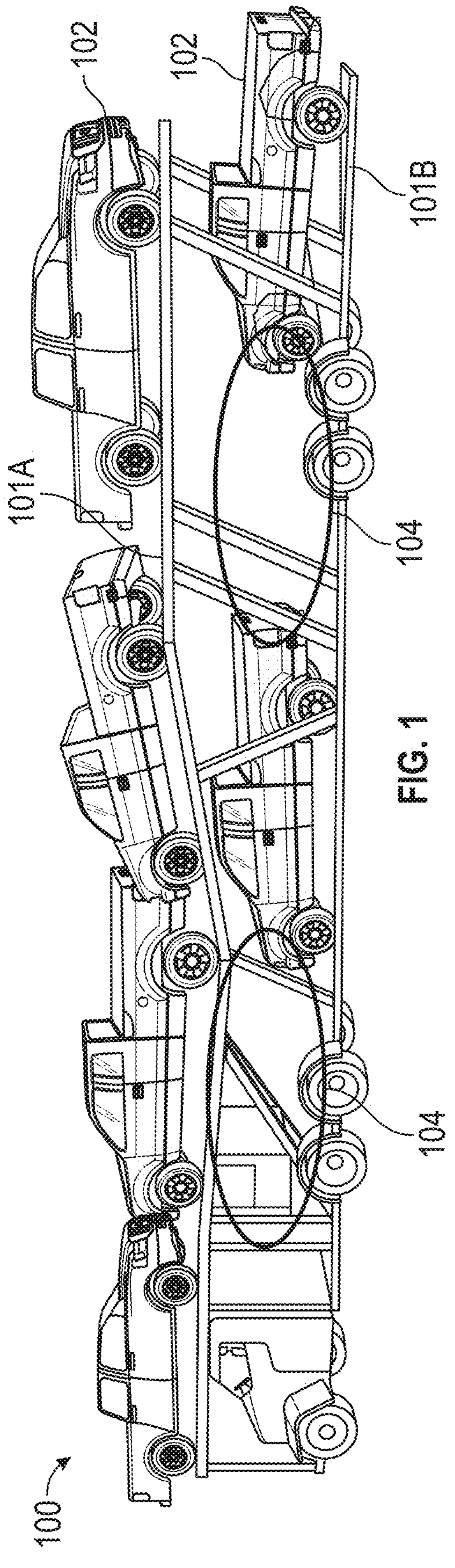
FIG. 1 illustrates a vehicle hauler, in accordance with at least one embodiment of the present disclosure.
Figure 2:
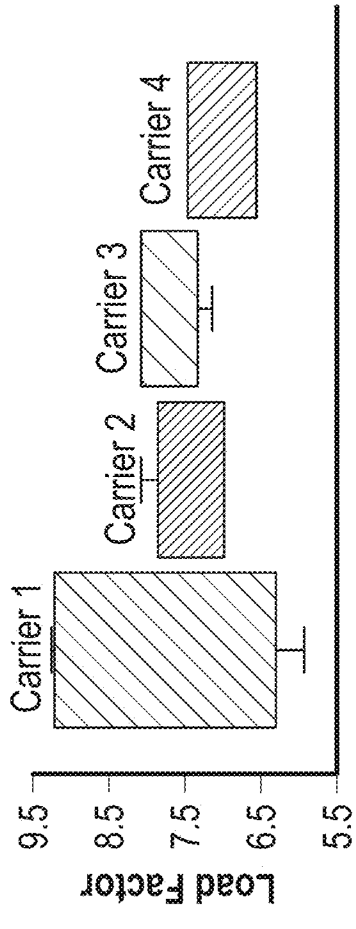
FIG. 2 is a graph that plots fluctuating load factors across multiple vehicle haulers/carriers, according to certain illustrative embodiments of the present disclosure.

FIG. 1 illustrates a vehicle hauler 100 which, in this illustrative embodiment, is a truck having a two ramp layers 101A,B thereon in which to haul a plurality of vehicles 102. As previously mentioned, the truck loading scheduling is a rather challenging task due to multiple restrictions in loading (e.g., dimensions, weight, time, vehicle destination proximity, etc.). Existing loading operations rely heavily on human operators' decisions at the scene. The lack of a systematic, optimal truck loading procedure has led to frequent unutilized spots 104 and high variations in loading efficiency across multiple delivery partners, as can be seen in the chart of FIG. 2 which shows fluctuating load factors across carriers 1-4. Further challenges arise when determining the routes to deliver the vehicles whose destinations sometimes are at different locations. These routing choices clearly have great impact on the distance and transit time to deliver the vehicles.

Accordingly, there is a pressing need to develop a systematic approach to improve the truck loading efficiency and routing performance, which will reduce the number of truck haulers used and mileages during transit, and consequently lessen transport cost and green gas emissions. In view of this, the present disclosure provides methods and systems to improve the lead time (time between vehicle tendered and delivery to customer), as well as reduce the workload of site truck loading planners.

The illustrative embodiments described herein are innovative in at least the following aspects. First, certain illustrative systems consider the truck loading and dynamic routing in a unified optimization framework to maximize the loading efficiency, the utilization of drivers, and routing performance while explicitly considering various loading constraints (e.g., dimension, load, height etc.) and the legal daily driving hours. This unified framework provides optimal truck loading and driver assignment scheduling simultaneously. Secondly, the system utilizes a RNN framework to forecast road traffic during transit that incorporates the spatio-temporal dynamics of the road traffic. Factors such as time of the day, day of the week, weather, and traffic flow from neighboring traffic grids are inputs in the RNN model.

Unlike existing traffic predictions from commercial Apps (e.g., Google Maps) that use historical traffic statistics, the disclosed methods augment the forecast with dynamic traffic features such as weather conditions and recent traffic conditions from neighboring grids. This forecast will greatly facilitate the dynamic routing of the hauler truck to deliver the vehicles to different destinations. Further, the forecast will also be incorporated in the optimization problem to explicitly tackle the transit time uncertainty as a chance constraint. This, in turn, will result in less conservative results and better efficiency as compared to using average or worst-case transit time (as in conventional approaches). Last, the methods utilize heuristics to efficiently and robustly solve the high-dimensional chance-constrained MIP problem. Mixed integer quadratic programming (MIQP) is then used to reformulate the problem and decompose the problem into substructures so the algorithm can quickly adapt to local changes without resolving the entire problem every time. These local changes may be changes to delivery requests, changes in traffic patterns, etc. Collectively, these advances will result in a truck loading and dynamic routing system that standardizes the operation procedure with improved efficiency for significant reductions in transportation cost and green gas emissions.

In the following description is separated into five sections: 1) formulation of the unified truck loading and dynamic routing problem (Section I); 2) development of a machine-learning based transit time prediction based on spatio-temporal characteristics (Section II); 3) development of an optimal dynamic routing with a time-expanded network (Section III); 4) development of an efficient and robust MIP solver by exploiting heuristics and the structure of the optimization problem (Section IV); and 5) system prototype and case study on San Antonio to Houston (or other routes with similar volume) vehicle dispatch (Section V).

Section 1

Consider a Toyota vehicle manufacturing plant which receives a set of orders for the upcoming days. For each day, the order consists of a list of vehicles, Vi, i=1, 2, . . . , N, which need to be transported to another depot or distribution center no later than a specific lead time. Each vehicle can be characterized by a tuple Vi={wi, li, hi, di,Di}, where wi, li, hi, di, and Di represent the weight, length, height, days to the lead time, and its destination ID, respectively. After the vehicles are manufactured, they will be first parked in a parking yard and wait to be loaded by the truck hauler. The vehicles are parked in lanes and each lane will be loaded into a hauler for transport. Each lane will be served by a truck hauler in a first-in-first-out (FIFO) manner. The vehicles in the same truck may have different destinations and it is desirable to load vehicles of close destinations in one truck to shorten the travel time.

In the optimization methods described herein, several constraints are respected in the truck loading. First of all, the truck has a maximum weight capacity W. Therefore, the total weight of the vehicles loaded in one truck cannot exceed W. The truck has two axles (front and rear) that can support the load and there are restrictions on the maximum weight each axle can support. In addition, for safety reasons the load has to be well spread out over the truck and must be appropriately distributed and/or balanced between the two axles. This constraint can be enforced by ensuring that the center of gravity of the load is between the front and the rear axles. In certain illustrative embodiments, this constraint may be a specified range of threshold balance tolerances or a specific load balance variable. Furthermore, each layer of the hauler has to provide enough spacing between vehicles to avoid damage due to severe vibrations. Also, each column is restricted to a height maximum to follow road height limits. After the truck loading plan is done, each hauler will be assigned to a driver to drive the truck. The drivers have to obey the law of maximum hours allowed to drive continuously as well as in a day.

Figure 3:
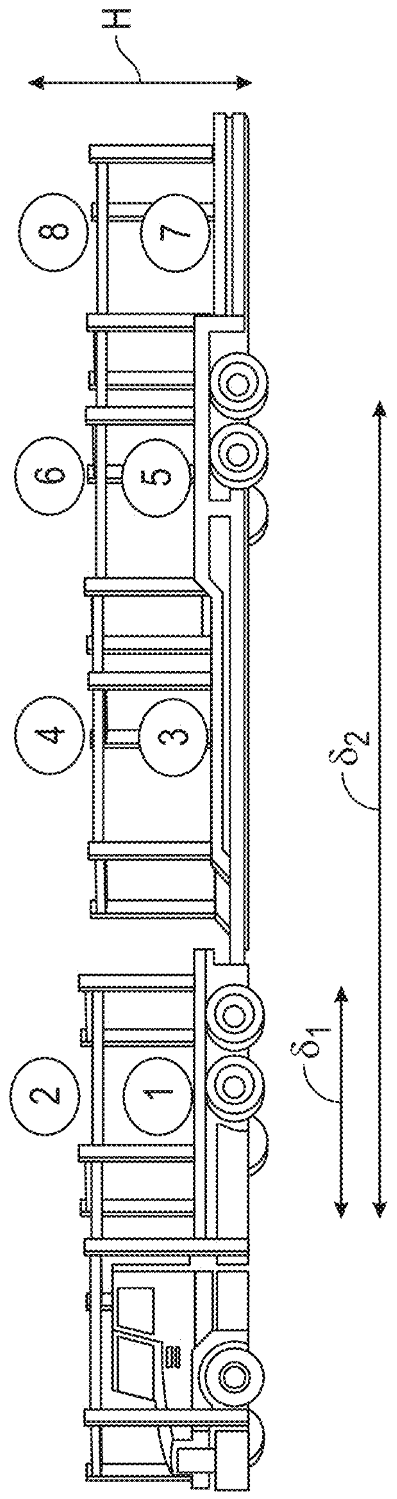
FIG. 3 illustrates a truck hauler with two axles and eight loading ramps, in accordance with at least one embodiment of the present disclosure.

The objective of the illustrative truck loading and driver allocation optimization methods described herein is to minimize the number of trucks used to transport the vehicles to the distribution center as well as minimize their overall travel distance while satisfying the aforementioned constraints. FIG. 3 illustrates a truck hauler with two axles and eight loading ramps. With the hauler illustrated in FIG. 3 as an example (other hauler configurations can be treated similarly), the problem can be formulated as a chance-constrained mixed integer programming (MIP) problem as shown below:

$$\min J = \sum_{j=1}^{K} y_j + \mu \sum_{j=1}^{K} y_j Dist(V_j)$$

$$\text{s.t.} \sum_{i=1}^{N} \sum_{m=1}^{8} x_{ijm} w_i \le y_j W, \ \forall\ j = 1, 2, \ldots, K \text{ (Gross weight)}$$

$$\sum_{i=1}^{N} \sum_{m=1}^{4} x_{ijm} w_i \le y_j W_1, \ \forall\ j = 1, 2, \ldots, K \text{ (Front weight)}$$

$$\sum_{i=1}^{N} \sum_{m=5}^{8} x_{ijm} w_i \le y_j W_2, \ \forall\ j = 1, 2, \ldots, K \text{ (Rear axle weight)}$$

$$\sum_{i=1}^{N} \sum_{m=1}^{4} x_{ij(2m-1)} l_i \le y_j L_1, \ \forall\ j = 1, 2, \ldots, K \text{ (Lower layer spacing)}$$

$$\sum_{i=1}^{N} \sum_{m=1}^{4} x_{ij(2m)} l_i \le y_j L_2, \ \forall\ j = 1, 2, \ldots, K \text{ (Upper layer spacing)}$$

$$\sum_{i=1}^{N} [x_{ij(2m-1)} h_i + x_{ij(2m)} h_i] \le y_j H, \ \forall\ j = 1, 2, \ldots, K, \ \forall\ m = 1, 2, \ldots, 4 \text{ (Height)}$$

$$y_j \sigma_1 \le \sum_{i=1}^{N} \sum_{m=1}^{8} x_{ijm} w_i a_m \Big/ \sum_{i=1}^{N} \sum_{m=1}^{8} x_{ijm} w_i \le y_j \sigma_2, \ \forall\ j = 1, 2, \ldots, K \text{ (Balancing)}$$

$$Pr\left[\sum_{j=1}^{K} \sum_{m=1}^{8} x_{ijm} t_0 j + Tr \le d_i\right] \ge p, \ \forall\ i = 1, 2, \ldots, N \text{ (Lead time)}$$

$$Pr\left[\sum_{j=1}^{8} z_{jk}\left(t_k + T * \sum_{i=1}^{N} x_{ijm} d_i\right) \ge Tr\right] p, \ \forall\ k = 1, 2, \ldots, K \text{ (Allowable Hours)}$$

$$\sum_{i=1}^{N} \sum_{m=1}^{8} x_{ijm} = 1, \ \forall\ i = 1, 2, \ldots, N \text{ (Vehicle Assignment)}$$

$$\sum_{k=1}^{K} z_{jk} = 1, \ \forall\ j = 1, 2, \ldots, K \text{ (Driver Assignment)}$$

$$x_{ijm} \in \{0, 1\}, \ \forall\ i = 1, 2, \ldots, N, \ j = 1, 2, \ldots, K, \ m = 1, 2, \ldots, 8 \text{ (Binary)}$$

$$y_j \in \{0, 1\}, \ \forall\ j = 1, 2, \ldots, K \text{ (Binary)}$$

$$z_{jk} \in \{0, 1\}, \ \forall\ j = 1, 2, \ldots, K, \ k = 1, 2, \ldots, M \text{ (Binary)}$$

where $x_{ijm}$, $y_j$, and $z_{jk}$ are binary decision variables and $x_{ijm}$, =1 if vehicle i is placed on hauler j, ramp position m, and $y_j$=1 if hauler j is used for transport whereas $z_{jk}$=1 if hauler j is assigned to driver k. So the system considers many variables including, for example, the position of the vehicles on ramps of the hauler, as well as loading and unloading sequences.

In this illustrative method, the objective is to minimize the number of truck haulers used as well as reduce the sum of distance traveled for the vehicles with μ>0 as the weighting factor and Vj representing the set of vehicles loading on hauler j. The first three constraints are the weight load constraints on the overall hauler, front axle, and rear axle, respectively, with W1 and W2 being the load limits of the front axle and the rear axle, respectively. The fourth and fifth constraints are the layer constraints with L1 and L2 being the layer spacing limits of the lower layer and upper layer, respectively. The Height constraints are imposed to make sure the loaded hauler does not exceed the road height l imit H.

The balancing constraint is to restrict the center of gravity of the load to lie between the front and rear axles for safety reasons, where σ1 and σ2 are the axle distances to the front of the loading space from the front axle and the rear axle, respectively. The Lead time constraint is to ensure the vehicle is delivered to the destination no later than the specified lead time with a probability p, by considering the loading time in the FIFO parking yard t0*j and the stochastic transit time Tr. Note that the transit time has large variations due to uncertain traffic, resulting in a stochastic constraint. Section II describes the development of a data-driven method to accurately predict the transit time. One can tune the chance constraint threshold p to tradeoff the total cost and the lead time accuracy; larger p will place greater emphasis on shorter lead time.

The Allowable Hours constraint is to restrict the driver hours per day and the longest continuous hours (e.g., up to legal hour limit) while guaranteeing the lead time with a probability p. The Vehicle Assignment and Driver Assignment constraints are to make sure that each vehicle is assigned to exactly one hauler and that each hauler is assigned to only one driver, respectively. The last three constraints specify that the variables $x_{ijm}$, $y_j$, and $z_{jk}$ are binary, which take values among 0 and 1, and $x_{ijm}$, =1 if vehicle i is placed on hauler j, ramp position m, and $y_j$=1 if hauler j is used for transport whereas $z_{jk}$=1 if hauler j is assigned to driver k.

Note the probabilistic constraints, Lead time and Allowable Hours, will produce less conservative results as compared to using the worst-case scenario. Assuming the transit time is Gaussian distributed, the illustrative method will transform the chance constraints using an error function method, which will translate the above chance-constrained MIP problem to a deterministic MIP problem. Several challenges need to be addressed to solve the induced MIP problem. Firstly, the problem is computationally demanding with a large number of vehicles. Computationally efficient algorithms must be used to solve the problem to be able to handle last-minute changes. Secondly, the transit time during transport has high variability and it is critical to incorporate predictive capabilities in the optimization to make the solutions less conservative. These two challenges will be addressed in the sections below.

Section II

This section describes an illustrative machine learning-based traffic forecasting method. The chance-constrained MIP problem formulated in Section I relies on the knowledge of the transit time, which has a direct influence on lead time and driver allocation plan. In addition, as the vehicles in a truck may have different destinations, the traffic information also has a great impact on the optimal routing choices. Therefore, it is crucial to accurately predict the traffic to improve the system efficiency.

Figure 4:
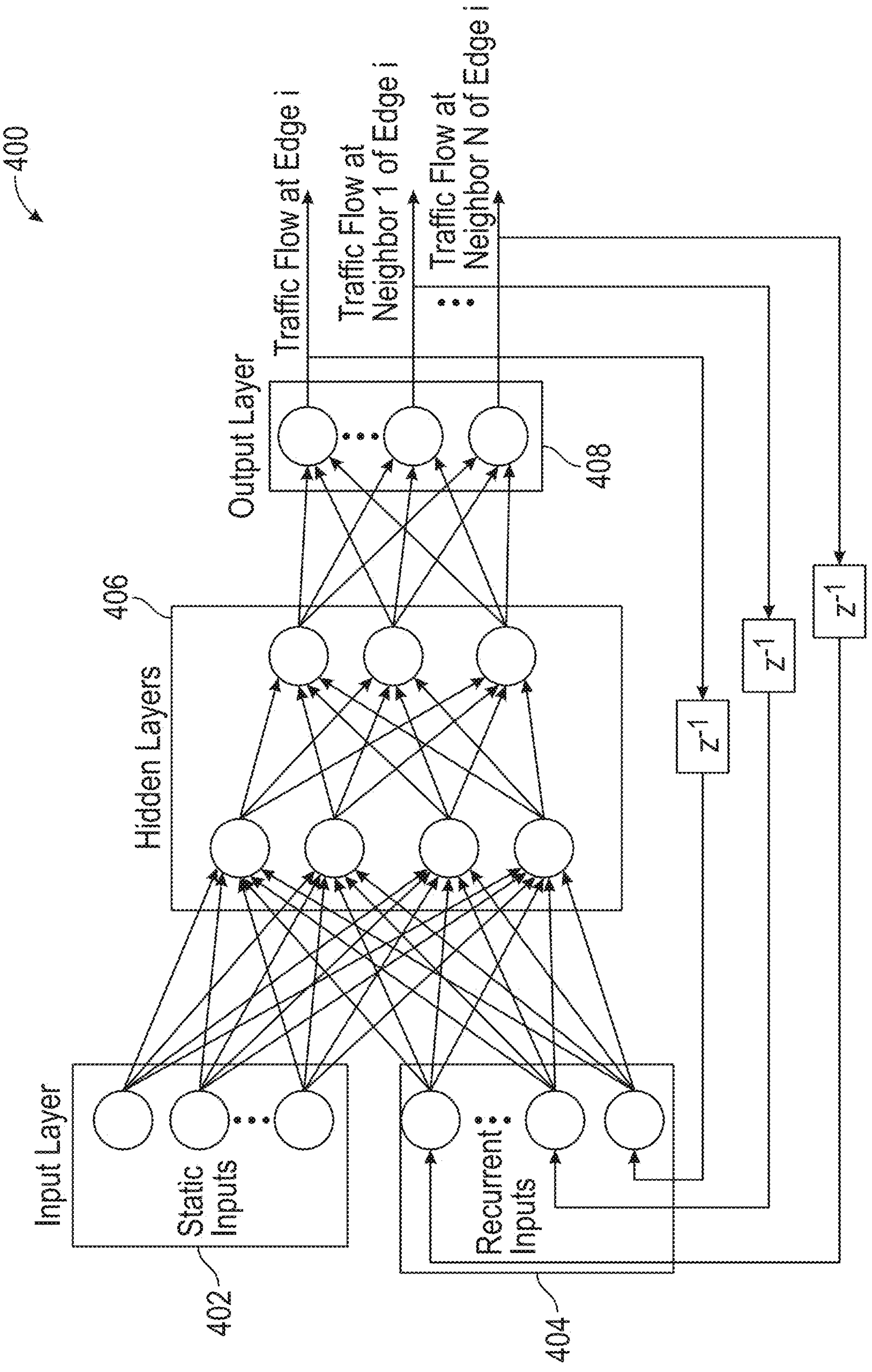
FIG. 4. is a block diagram is the structure of a hybrid recurrent neural network used to capture the spatio-temporal characteristics of traffic flow, in accordance with at least one embodiment of the present disclosure.

The traffic prediction has long been a challenging task due to large variations in traffic flow. For instance, the distribution of transit times across haulers from Toyota San Antonio to the Houston distribution has shown a large variation. Commercial software such as Google Maps predict transit time, but is purely based on averaged historic traffic statistics without considering near-term traffic dynamics. The future traffic is also highly dependent on the traffic in the recent history as well as the traffic in the neighboring traffic grids. In this illustrative disclosure, the system applies a machine learning-based traffic prediction module that incorporates spatio-temporal characteristics which are metrics describing the traffic evolution in space and in time, such as traffic density and average vehicle speed. Specifically, illustrative embodiments apply a recurrent neural network (RNN)-based traffic prediction. FIG. 4. is a block diagram is the structure of a hybrid RNN 400 used to capture the spatio-temporal characteristics of traffic flow. The inputs of RNN 400 include static/slow-varying variables 402 such as, for example, time of a day, day of a week, and weather conditions along the transportation route, along with recurrent inputs 404 which are the delayed outputs including the traffic flow over a specified road segment along with the traffic flows of its neighbors. Hidden layers 406 a linear combination of the inputs with network weights (training parameters) then fed through an activation function e.g., a rectified linear activation function (ReLu) function $f(x)=\max(\mathbf{0}, x)$. Output layer 408 similar to the hidden layer definition but with different weights. The output generated predicts the traffic flow at various neighboring grids. The output may then be fed back into the RNN as recurrent inputs 404 to iteratively update the learning of the neural network, where $Z^{-1}(x(k))=x(k-1)[$ is a delay operator. This will in turn update the loading plan or route based upon a variety of inputs such as, for example, a change notice in the delivery request or updated traffic data. This hybrid RNN design thus can characterize the spatial-temporal correlations of the traffic data.

In certain illustrative methods, the training of the network involves two phases. First, the hybrid RNN model is trained offline using existing traffic databases. Then, the online data collected from the truck operations is applied to the RNN model for online adaptation. This online adaptation is necessary because the prediction performance may vary due to geographic variations. The online data collection and RNN model updates may be performed on a cloud platform. The model performance may be evaluated based on the prediction error in the root mean square sense.

Section III

Since the vehicles in one truck hauler can have different destinations, the disclosed methods also determine the best sequence to deliver the vehicles to the destinations, including a loading and unloading sequence. This can be referred to as the Traveling Salesman Problem (TSP), which seeks a minimum-cost route starting and ending at the depot, visiting each destination exactly once. In this embodiment, the dynamic routing of the system will extend the classical TSP by 1) assigning each destination a time window to guarantee acceptable delivery time; and 2) by explicitly incorporating the transit time prediction described in this Section III in the routing optimization.

To predict transit times in certain illustrative embodiments, more formally, let More formally, let G=(N,A) be a complete directed graph with nodes/destination set N and arc set A. Let the cost of traversing arc a EA be ca ER+ and the time to traverse arc a∈A be τa∈Z+. Each destination n EN can only be visited during the time interval [en, ln]. The method seeks a minimum-cost route starting and ending at the depot, visiting each destination n EN only once in its associated time window, [en, tn]. As the arc traverse time to can be predicted using the RNN developed in Section II, the network G is not static over time. Instead, the arc traverse time and costs are time varying.

Figure 5:
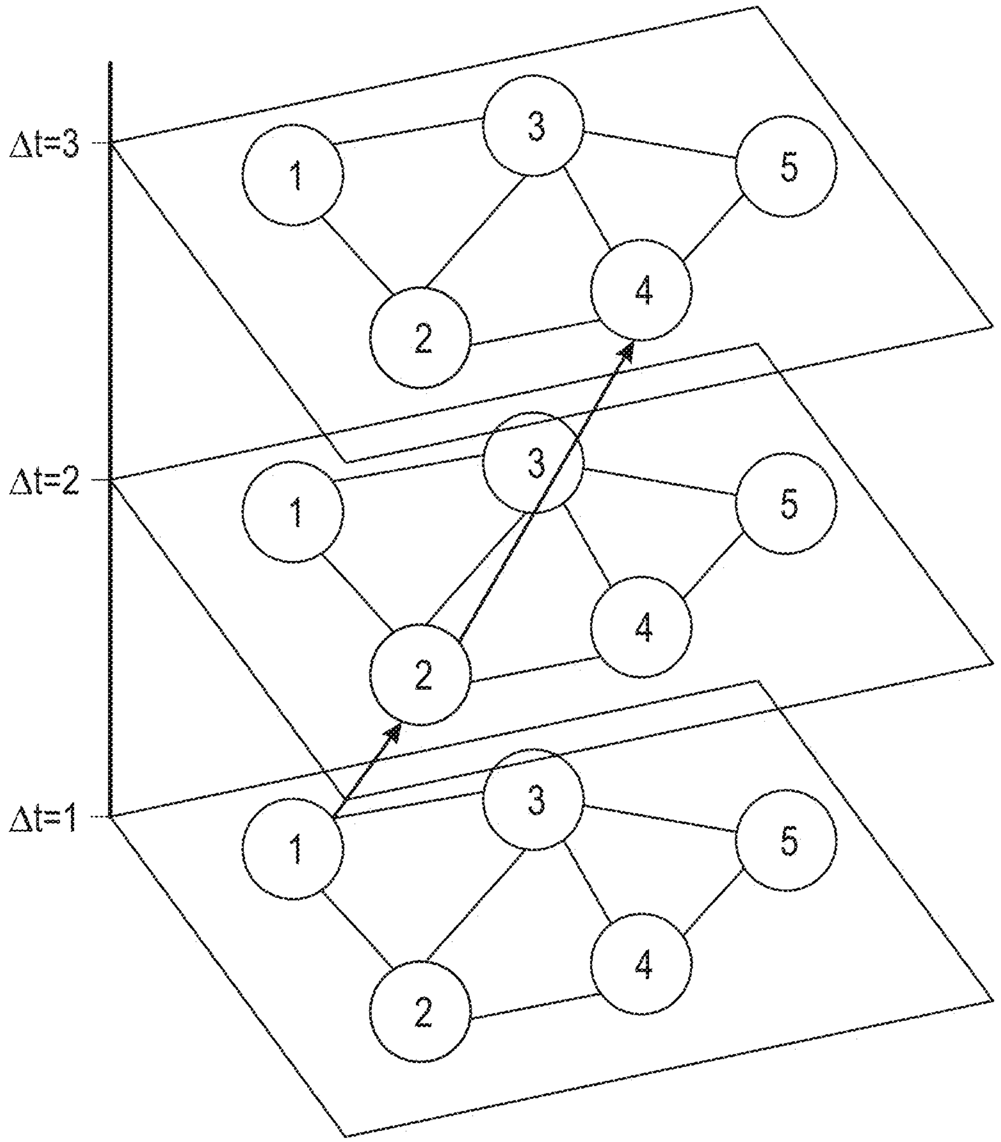
FIG. 5. is a time expanded graph with five destinations used to determine travel times, in accordance with at least one embodiment of the present disclosure.

To address this challenge, embodiments of the present disclosure exploit the concept of time-expanded graphs, in which a node encodes both a location and a time interval, and solutions prescribe dispatch time intervals for trucks and vehicles. An example of the time-expanded graph is shown in FIG. 5, where five destinations are illustrated, and at each time steps, the travel time between nodes is predicted using the RNN developed in Section II. Once the time-expanded graph is formed, the dynamic routing problem may be reduced to another integer programming problem. As the time-scale is critical for the size of the time-expanded graph, the system utilizes methods to efficiently construct the time scale based on the expected transit time. The system also employs efficient MIP solvers to be able to generate the dynamic routes in real-time, which is the focus of next subsection.

Section IV

In general, mixed integer programming (MIP) approaches use strategies such as branch and bound, branch and cut, branch and reduce, and outer approximation, to handle integer variables. Well-developed commercial solvers, such as Gurobi and CPLEX, exist for solving mixed integer linear programming (MILP) and mixed integer quadratic programming (MIQP) problems. Solvers such as AOA, BARON, Knitro, Bonmin have been developed that handle nonlinear mixed integer programming problems. The computational cost of solving MILPs, MIQPs and MINLPs can be very substantial especially for higher dimensional problems. Consequently, the treatment of practical problems, such as our unified truck loading and dynamic routing problem, invariably exploits problem-specific structure, heuristic approximations and simplifications.

In developing the methods described herein, these problems have been carefully analyzed and have resulted in the development of suitable approximations with the objective of reducing the problem to a convex MIQP or to a sequence of MIQPs. During that development, the structure of the problem was also carefully analyzed so that when minor changes occur (e.g., prioritizing certain in-demand vehicles), the system can effectively solve the new problem based on the old solution without solving the whole problem again. The disclosed systems then utilize available solvers from the perspective of accuracy, robustness and computational time, and enhance them with additional algorithmic modifications as needed to improve their speed and accuracy.

Section V

Figure 6:
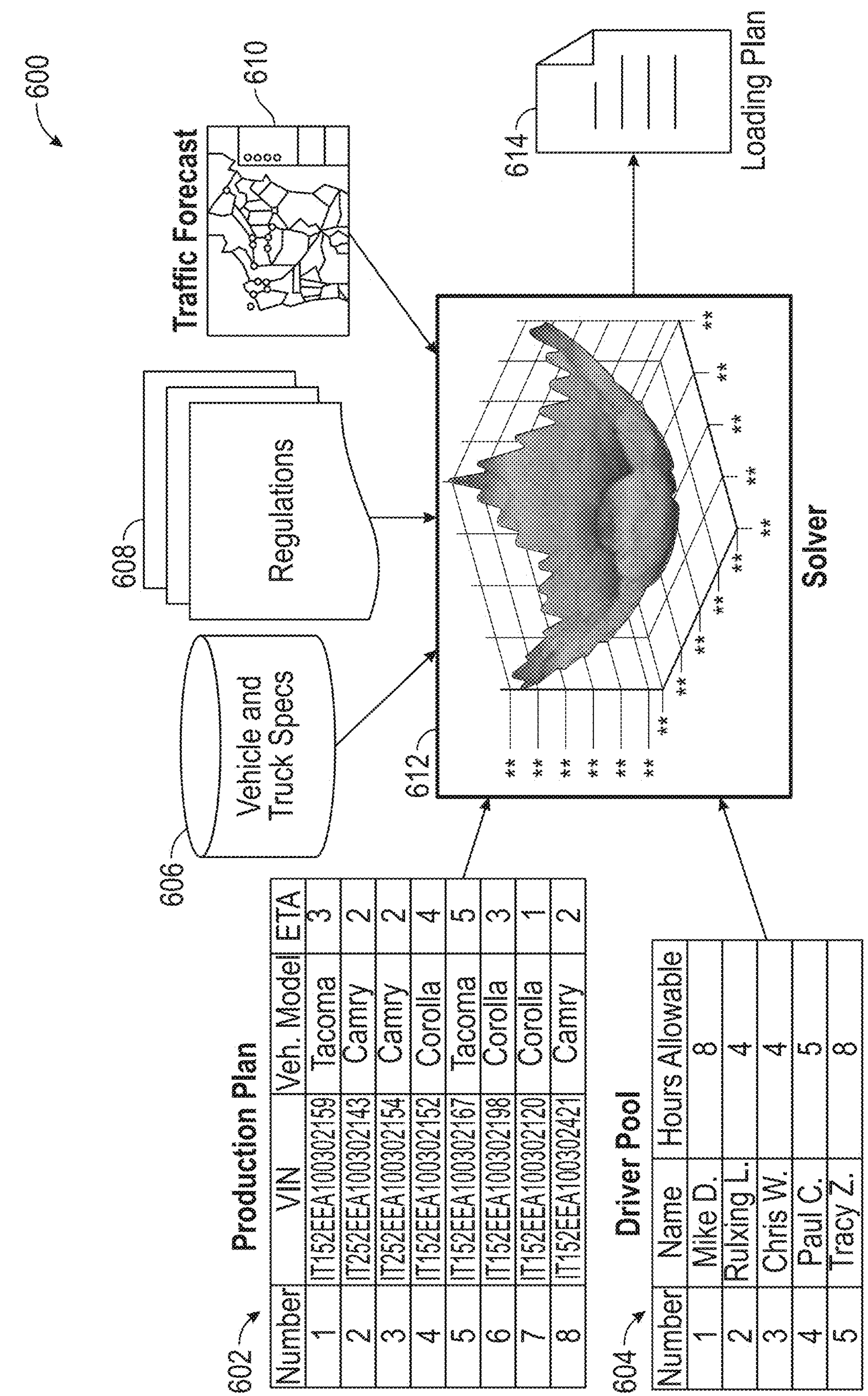
FIG. 6 is a representative illustration of a vehicle hauler loading and route optimization system, in accordance with at least one embodiment of the present disclosure.

To demonstrate the effectiveness of the proposed truck loading and dynamic routing system, a software prototype was developed and employed in the San Antonio to Houston vehicle distribution route (or other distribution routes with sufficient volume). The disclosed software architecture 600 of an illustrative embodiment is shown in FIG. 6, where two Excel files are the inputs to the software. These excel files are production plan 602 and driver pool 604. The production plan file 602 specifies the list of vehicles to be transported with attributes including vehicle identification number (VIN), vehicle model, and estimate time of arrival. The driver pool file 604 specifies the list of drivers available with attributes including driver name and remaining hours to drive for the day (e.g., legally allowed hours). The system 600 will also query databases that contain the dimension and weight specifications of the vehicles and the truck hauler 606, as well as regulatory restrictions (e.g., weight, height, driver hours allowed etc.) 608. Finally, by incorporating the RNN-based traffic forecast 610 (Section IV), the chance-constrained MIP problem of Section I is then defined and solved using the algorithm developed in Section IV by solver 612. A detailed truck loading and driver assignment plan 614 will then be generated for the use of the loading manager. Ultimately, this analysis results in the output of an estimated time of arrival for the vehicles at the various destinations which reduces transportation costs, the number of trucks necessary for delivery and reduces greenhouse gas emissions.

Figure 7:
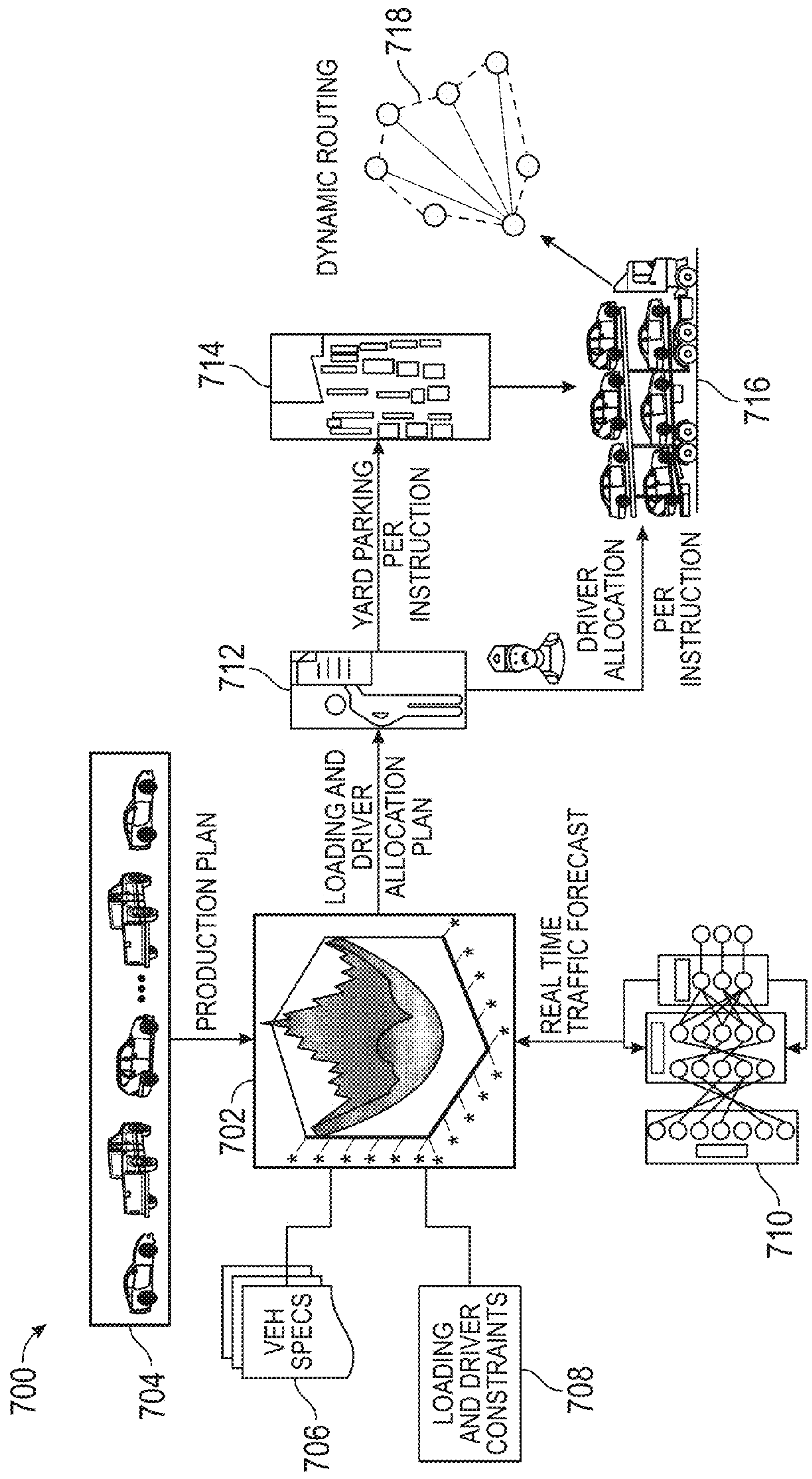
FIG. 7 is a block diagram of a standardized procedure for truck loading and dynamic routing, according to certain illustrative methods of the present disclosure.

FIG. 7 is a block diagram of a standardized procedure for truck loading and dynamic routing, according to certain illustrative methods of the present disclosure. The system 700 features a chance-constrained MIP solver 702 that takes various inputs including the production plan 704 in the upcoming days, the vehicle specifications (dimension, weights etc.) 706, the loading constraints from the government 708, the driver work hour restrictions 708, as well as real-time traffic forecast 710, and generates an optimal loading and driver allocation plan and a vehicle routing solution 712. A load instructor module will transmit the instructions to the carriers. In response, the vehicles will be parked in the yard according to the plan (714) and then loaded to the truck hauler with the specified driver (716). A dynamic routing module 718 will then navigate the truck hauler to the best routes to deliver the vehicles to different destinations based on real-time and predicted traffic patterns. This standardized, optimization-based workflow will not only significantly improve the loading efficiency and result in great reduction in transport cost and green gas emissions, but will also reduce the workload of the loading personnel on the ground.

Figure 8:
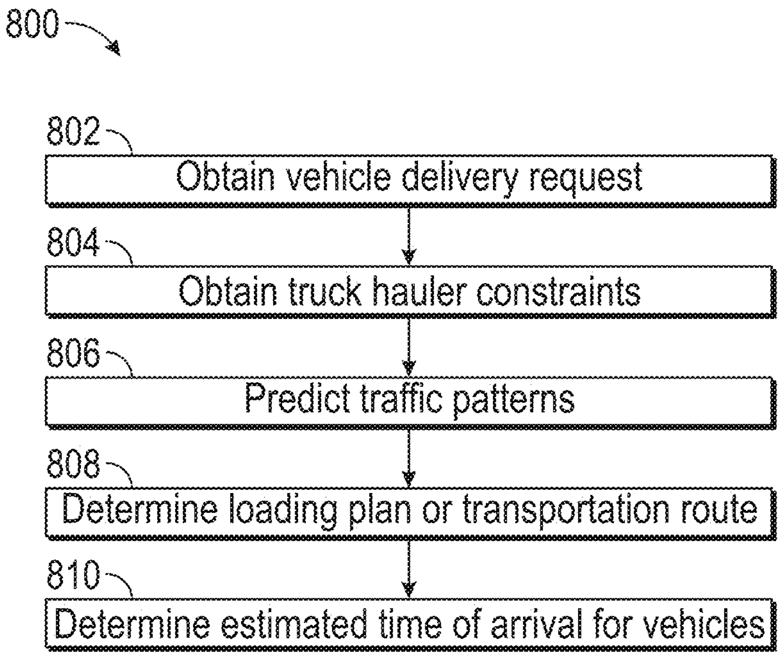
FIG. 8 is a flow chart of a method for the optimization and hauler loading and their transportation routes, according to certain illustrative embodiments of the present disclosure.

FIG. 8 is a flow chart of a method for the optimization and hauler loading and their transportation routes, according to certain illustrative embodiments of the present disclosure. In the illustrative method 800, the system obtains a request to deliver one or more vehicles to a destination at block 802. At block 804, the system then obtains constraints associated with the truck hauler that will be assigned the delivery request. These constraints may include any variety of constraints, such as dimensions of the vehicle hauler, weight tolerances of the vehicle hauler, road height limits of roads along the transportation route, load balancing of the hauler between a front and rear axle of the hauler, layer spacing of the hauler, predicting traffic, legal limits of driver hours, etc. At block 806, the system predicts traffic patterns along the transportation route or that may otherwise affect the delivery of the vehicles. At block 808, the system determines the optimal loading plan or transportation route for the hauler based upon analysis of the constraints and predicted traffic patterns. Thereafter, at block 810, the system determines the estimated time of arrival for each vehicle on the hauler based upon the loading plan and/or route.

Figure 9:
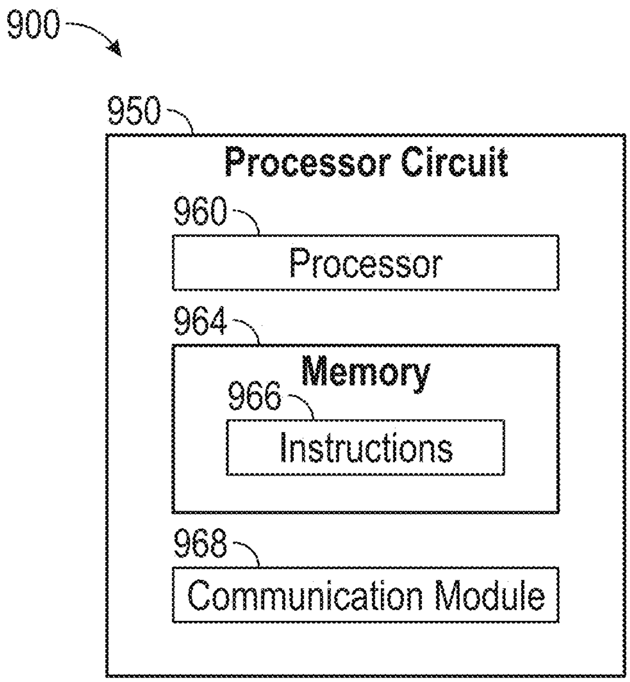
FIG. 9 is a diagrammatic illustration of a processor circuit 950, according to embodiments of the present disclosure.

FIG. 9 is a diagrammatic illustration of a processor circuit 950, according to embodiments of the present disclosure. The processor circuit 950 may be implemented in a computer system to optimize hauler loading and transportation routes as described herein. Such systems may be embodied as a desktop style system, a portable device, or other devices or workstations (e.g., third-party workstations, network routers, etc.), or on a cloud processor or other remote processing unit, as necessary to implement the method. As shown, the processor circuit 950 may include a processor 960, a memory 964, and a communication module 968. These elements may be in direct or indirect communication with each other, for example via one or more buses.

The processor 960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 960 may also comprise another hardware device, a firmware device, or any combination thereof configured to perform the operations described herein. The processor 960 may also be implemented as a combination of computing devices, e.g., a combination of a DSP and a microprocessor, a plurality of microprocessors, one or more microprocessors in conjunction with a DSP core, or any other such configuration.

The memory 964 may include a cache memory (e.g., a cache memory of the processor 960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 964 includes a non-transitory computer-readable medium. The memory 964 may store instructions 966. The instructions 966 may include instructions that, when executed by the processor 960, cause the processor 960 to perform the operations described herein. Instructions 966 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 968 can include any electronic circuitry and/or logic circuitry to facilitate direct or indirect communication of data between the processor circuit 950, and other processors or devices. In that regard, the communication module 968 can be an input/output (I/O) device. In some instances, the communication module 968 facilitates direct or indirect communication between various elements of the processor circuit 950. The communication module 968 may communicate within the processor circuit 950 through numerous methods or protocols. Serial communication protocols may include but are not limited to US SPI, $I^2C$, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and a central server, or readings from the sensors) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method, comprising, with a processor that includes a memory:

training a hybrid recurrent neural network using first traffic patterns and weather patterns, the hybrid recurrent neural network comprising:

an input layer comprising:

a plurality of static inputs comprising time, date, and the weather patterns; and a plurality of recurrent inputs comprising the first traffic patterns;

a plurality of hidden layers; and an output layer comprising output values comprising predicted traffic patterns;

obtaining a request to deliver a plurality of vehicles from a depot to a plurality of destinations;

obtaining one or more constraints of a hauler used to deliver vehicles to the plurality of destinations;

in real time, formulating a problem that solves for second traffic patterns associated with the plurality of destinations;

in real time, using chance-constrained mixed integer quadratic programming, decomposing the problem into substructures that adapt to local changes in delivery requests or traffic patterns;

in real time, with the hybrid recurrent neural network, solving at least some of the substructures to obtain a prediction of the second traffic patterns;

in real time, based upon the constraints and the second traffic patterns and weather patterns, determining at least one of a loading plan or dynamic route for the hauler;

in real time, based upon the loading plan or dynamic route, determining estimated times of arrival for the vehicles to the plurality of destinations;

in real time, using the prediction, iteratively updating the training of the hybrid recurrent neural network during transit of the hauler, by, with at least one delay operator, feeding at least one of the output values back into at least one of the recurrent inputs;

in real time, with the hybrid recurrent neural network, solving at least some of the substructures to update a prediction of the second traffic patterns;

in real time, based upon the constraints, the weather patterns, and the second traffic patterns, updating at least one of the loading plan or the dynamic route for the hauler; and dynamically, during transit of the hauler, generating an output, wherein the output comprises the estimated times of arrival for the vehicles to the plurality of destinations, wherein the computer-implemented method reduces greenhouse gas emissions by reducing a number of haulers needed to deliver the one or more vehicles to the destination, and wherein the dynamic route is a minimum-cost route starting and ending at the depot and visiting each destination of the plurality of destinations exactly once.

2. The computer-implemented method as defined in claim 1, wherein based upon the constraints and the traffic patterns and weather patterns, the loading plan is determined, wherein the loading plan comprises a position of vehicles on the hauler.

3. The computer-implemented method as defined in claim 1, wherein the constraints comprise load balancing of the hauler such that a center of gravity of the load is between a front and rear axle of the hauler; or layer spacing of the hauler.

4. The computer-implemented method as defined in claim 1, further comprising:

receiving notice of a change to the vehicle delivery request; or receiving updated data on traffic patterns; and based upon the change notice or updated traffic pattern data, updating the loading plan or route.

5. The computer-implemented method as defined in claim 1, wherein the constraints comprise a load balance of the hauler;

wherein based upon the constraints and the traffic patterns and weather patterns, the loading plan is determined; and wherein determining the loading plan further comprises determining a position of the vehicles on the hauler such that a distribution of the vehicles between a front and rear axle of the hauler meets the constraints of the load balance.

6. A system, comprising:

a processor operable to perform a method comprising:

training a hybrid recurrent neural network using first traffic patterns and weather patterns, the hybrid recurrent neural network comprising:

an input layer comprising:

a plurality of static inputs comprising time, date, and the weather patterns; and a plurality of recurrent inputs comprising the first traffic patterns;

a plurality of hidden layers; and an output layer comprising output values comprising predicted traffic patterns;

obtaining a request to deliver a plurality of vehicles to a plurality of destinations, wherein each vehicle of the plurality of vehicles is associated with a destination of the plurality of destinations;

obtaining one or more constraints of a hauler used to deliver vehicles to the plurality of destinations;

in real time, formulating a problem that solves for second traffic patterns associated with the plurality of destinations;

in real time, using chance-constrained mixed integer quadratic programming, decomposing the problem into substructures that adapt to local changes in delivery requests or traffic patterns;

in real time, with the hybrid recurrent neural network, solving at least some of the substructures to obtain a prediction of the second traffic patterns and weather patterns;

in real time, based upon the constraints and the predicted second traffic patterns, determining a loading plan and dynamic route for the hauler;

in real time, based upon the loading plan and the hauler route, determining an estimated time of arrival for each of the vehicles to the associated destination;

in real time, using the prediction, iteratively updating the training of the hybrid recurrent neural network during transit of the hauler, by, with at least one delay operator, feeding at least one of the output values back into at least one of the recurrent inputs;

in real time, with the hybrid recurrent neural network, solving at least some of the substructures to update a prediction of the second traffic patterns and weather patterns;

in real time, based upon the constraints and the second traffic patterns and weather patterns, updating at least one of the loading plan or the dynamic route for the hauler; and dynamically, during transit of the hauler, outputting, to a display, the estimated time of arrival for each of the vehicles to the associated destination, wherein the computer-implemented method reduces greenhouse gas emissions by reducing a number of haulers needed to deliver the vehicles to the one or more destination, and wherein the dynamic route is a minimum-cost route starting and ending at a depot and visiting each destination of the plurality of destinations exactly once.

7. The system as defined in claim 6, wherein the loading plan comprises a position of vehicles on the hauler.

8. The system as defined in claim 6, wherein the constraints comprise one or more of:

load balancing of the hauler such that a center of gravity of the load is between a front and rear axle of the hauler; or layer spacing of the hauler.

9. The system as defined in claim 6, wherein the method further comprises:

receiving notice of a change to the vehicle delivery request; and updating the loading plan and route using the mixed integer quadratic programming method and the hybrid recurrent neural network.

10. The system as defined in claim 6, wherein:

the constraints comprise a load balance of the hauler; and determining the loading plan comprises determining a position of the vehicles on the hauler such that a distribution of the vehicles between a front and rear axle of the hauler meets the constraints of the load balance.

11. A method for determining estimated times of arrival for a vehicle hauler, comprising:

training a hybrid recurrent neural network using first traffic patterns and weather patterns, the hybrid recurrent neural network comprising:

an input layer comprising:

a plurality of static inputs comprising time, date, and the weather patterns; and a plurality of recurrent inputs comprising the first traffic patterns;

a plurality of hidden layers; and an output layer comprising output values comprising predicted traffic patterns;

obtaining a constraint of a hauler used to deliver vehicles to a plurality of destinations;

in real time, formulating a problem that solves for second traffic patterns associated with the plurality of destinations;

in real time, using chance-constrained mixed integer quadratic programming, decomposing the problem into substructures that adapt to local changes in delivery requests or traffic patterns;

in real time, with the hybrid recurrent neural network, solving at least some of the substructures to obtain a prediction of the second traffic patterns and weather patterns;

optimizing a loading plan and a dynamic route for the hauler based upon the constraint and predicted second traffic patterns;

in real time, applying the loading plan and the dynamic route to determine estimated times of arrival for the vehicles to the plurality of destinations;

in real time, using the prediction, iteratively updating the training of the hybrid recurrent neural network during transit of the hauler, by, with at least one delay operator, feeding at least one of the output values back into at least one of the recurrent inputs;

in real time, with the hybrid recurrent neural network, solving at least some of the substructures to update a prediction of the second traffic patterns;

in real time, based upon the constraints and the second traffic patterns, updating at least one of the loading plan or the dynamic route for the hauler;

in real time, applying the loading plan and the dynamic route to update the estimated times of arrival for the vehicles to the plurality of destinations; and dynamically outputting, to a display, during transit of the hauler, the estimated times of arrival for the vehicles to the plurality of destinations, wherein the method reduces greenhouse gas emissions by reducing a number of haulers needed to deliver the one or more vehicles to the destination, and wherein the dynamic route is a minimum-cost route starting and ending at a depot and visiting each destination of the plurality of destinations exactly once.

12. The method of claim 11, wherein:

the constraints comprise a load balance of the hauler; and optimizing the loading plan comprises determining a position of the vehicles on the hauler such that a distribution of the vehicles between a front and rear axle of the hauler meets the constraints of the load balance.

13. The method as defined in claim 11, wherein optimizing the loading plan and route is also based upon the weather patterns.

14. The method as defined in claim 11, further comprising:

receiving notice of a change to a vehicle delivery request to deliver the vehicles; and updating the loading plan and route using the mixed integer quadratic programming method.

15. The method as defined in claim 11, wherein the constraints comprise one or more of:

load balancing of the hauler such that a center of gravity of the load is between a front and rear axle of the hauler; or layer spacing of the hauler.

16. The method as defined in claim 11, wherein determining the route is based upon the use of only one driver per hauler.

* * * * *